United States Patent
Sankaran et al.

(10) Patent No.: US 9,436,534 B2
(45) Date of Patent: Sep. 6, 2016

(54) METHOD AND SYSTEM FOR PREEMPTIVE DETECTION OF OCCURRENCE OF FAULTY CONDITIONS BASED ON RESOURCE USAGE

(75) Inventors: Venkataramanan Tenkarai Sankaran, Bangalore (IN); Deepak Narayan Hoshing, Bangalore (IN); Suresh Nochilur Ranganathan, Bangalore (IN); Manoj Kumar Agrawal, Orissa (IN)

(73) Assignee: Infosys Limited, Bangalore (IN)

( * ) Notice: Subject to any disclaimer, the term of this patent is extended or adjusted under 35 U.S.C. 154(b) by 262 days.

(21) Appl. No.: 13/979,135

(22) PCT Filed: Jan. 17, 2011

(86) PCT No.: PCT/IN2011/000033
§ 371 (c)(1),
(2), (4) Date: Dec. 17, 2013

(87) PCT Pub. No.: WO2012/098554
PCT Pub. Date: Jul. 26, 2012

(65) Prior Publication Data
US 2014/0095945 A1    Apr. 3, 2014

(51) Int. Cl.
*G06F 11/00* (2006.01)
*G06F 11/07* (2006.01)
*G06F 9/50* (2006.01)
*G06F 11/30* (2006.01)
*G06F 11/34* (2006.01)

(52) U.S. Cl.
CPC .......... *G06F 11/0754* (2013.01); *G06F 9/50* (2013.01); *G06F 11/008* (2013.01); *G06F 11/0715* (2013.01); *G06F 11/0793* (2013.01); *G06F 11/3466* (2013.01); *G06F 11/3065* (2013.01); *G06F 11/3409* (2013.01); *G06F 2201/81* (2013.01); *G06F 2201/865* (2013.01); *G06F 2209/5022* (2013.01)

(58) Field of Classification Search
CPC ............ G06F 11/0754; G06F 11/008; G06F 11/0715; G06F 11/0793; G06F 11/30; G06F 11/076; G06F 11/36; G06F 11/3604; G06F 11/3608; G06F 2209/5022; G06F 9/50
USPC ....... 714/47.2, 25, 26, 27, 33, 38.1, 47.1, 51
See application file for complete search history.

(56) References Cited

U.S. PATENT DOCUMENTS

| | | | | |
|---|---|---|---|---|
| 6,134,601 | A * | 10/2000 | Spilo | G06F 9/50 711/E12.068 |
| 2003/0163602 | A1* | 8/2003 | Johnson | G06F 9/542 719/328 |
| 2007/0294673 | A1* | 12/2007 | Guerrera | G06F 11/3419 717/130 |

(Continued)

*Primary Examiner* — Joseph D Manoskey
(74) *Attorney, Agent, or Firm* — Marc S. Kaufman; Nina Borders; Reed Smith LLP

(57) ABSTRACT

A method and a system have been disclosed for the preemptive detection of occurrence of one or more faulty conditions based on the usage of one or more resources. The faulty conditions are detected during an execution of a program; the program includes at least one function. The method includes initializing Application Program Interfaces (APIs) across the at least one function. After this, calls to the APIs used within a namespace of the program are intercepted. The interception is performed by the at least one function through extended method classes. Thereafter, the usage of the resources for the at least function intercepting the APIs is checked against a corresponding predetermined threshold limit. Once the usage of the resources is checked, context of the usage of the resources is identified based on a predefined knowledge. Subsequently, the occurrence of the faulty conditions is determined based on the identification.

30 Claims, 6 Drawing Sheets

(56) References Cited

U.S. PATENT DOCUMENTS

2012/0159570 A1\* 6/2012 Reierson ............... G06F 21/53 726/2

2014/0007140 A1\* 1/2014 Hall ..................... G06F 9/4443 719/328

\* cited by examiner

| File | Edit | Search | View | Tools | Macros | Configure | Help |

```
Java Library path = WAS/IBM/WebSphere/AppServer/java/jre/lib/IA64W: /WAS/IBM/WebSphere/AppServ
***********End Display Current Environment*********
Large Object Warning: [Ljava.lang.Object ;@1459792037 size: 1.26043701171875 Mb
Large Object Warning: [Ljava.lang.Object ; @3145480480 size: 2.01294708251953125Mb
Large Object Warning: com.infy.cis.srmbo.SRMAttributeInfo@1168130819 size 1.21356201171875Mb
Large object Warning: com.infy.cis.srmbo.SRMAttributeInfo@282822468 size: 1.21356201171875 Mb
Large object Warning: com.infy.cis.srmbo.SRMAttributeInfo@861052126 size 1.21356201171875 Mb
Large object Warning: com.infy.cic.srmbo.SRMObjectInfo@162864721 size: 1.21364593505859375 Mb
```

FIG. 4     Report illustrating Large Objects

| File   Edit   Format   View   Help |
|---|
| [ 9 /6/10 8:50:05 IST] 00000034 SystemErr  R com.infosys.insulate.FinacleLargeMemoryException |
| at com.infosys.insulate.InsulateUtil.throwingFunction (InsulateUtil.java:299) |
| at com.infosys.insulate.InsulateUtil.checkStatistics (InsulateUtil.java:99) |
| at com.infosys.insulate.util.ArrayList. add  (ArrayList.java:158) |
| at com.infy.cis.srmbo.SRMQueryBuilder. addAttribScope (SRMQueryBuilder. Java :1936) |
| at com.infy.cis.srmbo.SRMQueryBuilder. addAttribScope (SRMQueryBuilder. Java :1628) |
| at com.infy.cis.ui.common. RunQuery.tokenzeQueryClause (Run Query. Java :2547) |
| at com.infy.cis.ui.common. RunQuery.getResults (RunQuery. Java :1443) |
| at com.infy.cis.ui.common. RunQuery.getResults (RunQuery. Java :1359) |
| at com.infy.cis.ui.common. RunQuery.getResults (RunQuery. Java :1341) |
| at java.lang.reflect.Method.invoke (Method.java:585) |
| at com.infosys.fi.tools.servlets.FIUIservlet.doPost (Unknown Source) |
| at javax.servlet.http.HttpServlet.service (HttpServlet.java:763) |

FIG. 5    Report illustrating LargeMemoryException

METHOD AND SYSTEM FOR PREEMPTIVE DETECTION OF OCCURRENCE OF FAULTY CONDITIONS BASED ON RESOURCE USAGE

RELATED APPLICATION DATA

This application claims priority to International Application No. PCT/IN2011/000033, filed Jan. 17, 2011, the disclosure of which is hereby incorporated by reference in its entirety.

FIELD OF THE INVENTION

The present invention relates, in general, to fault detection in software programs (or business applications). More specifically, the invention relates to a method and a system for the preemptive detection of occurrence of faulty conditions occurring due to usage of resources.

BACKGROUND

Today, most of the businesses are supported by business applications, which act as the primary means of conducting business. The business applications help enterprises focus on their core business activities by integrating work processes seamlessly to speed up business processes and to improve workflow effectively. Further, these business applications when applied across various industries/enterprises have been helpful in meeting the needs of contemporary business requirements. Thus, in the fast changing business world, such applications have gained tremendous importance and popularity over the recent years.

Business applications can be developed in various programming languages as per requirements and ease of use. Examples of some popular programming languages are C, C# (ASP.Net), C++, Visual Basic (VB), VB.Net, Visual FoxPro, Pearl, Java, and JavaScript. Generally, application developers prefer object-oriented language, such as Java, because of its various features such as simplicity, modularity, and re-usability. Additional features supported by Java are distributed, interpreted, robust, secure, portable, automatic garbage collection, ease-of-use, and multi-threaded. Java also enables the application developers to develop applications on the Internet for servers, desktops computers, and small hand-held devices.

To develop any business application in Java, one or more classes and corresponding objects are created. The process of development further involves creation of threads within the business application; wherein the threads enhance the performance of Java platform. Once the business application is developed, it is executed by Java Run-Time Environment (JRE) or Java Virtual Machine (JVM). The execution of business application involves the allocation of various resources for example, memory, files, and connections to the business application. While executing the business application, the problems faced by the application developers many a times relates to resource over-allocation. Various examples of the resource over-allocation are memory over-allocation, file exhaustion, and connection over runs. Of these, memory over-allocation is the most common problem faced by the application developers. Memory over-allocation defines that the memory utilized by the business application has exceeded the value as pre-set for the business application. In general, memory over-allocation occurs when Java platform runs out of memory because of the non-availability of continuous memory or the memory is not getting de-allocated. When such situations occur, Java platform has no other option but to abort and this sometimes leads to failure/crashing of Java platform. This subsequently leads to the denial of service for multiple applications running on Java platform.

To counter memory over-allocation scenarios, Java facilitates garbage collection. The purpose of garbage collection is to find objects that are no longer required by an application and to remove the objects when they are no longer accessed or referenced. In other words, garbage collection is used to clear the unused memory by aging out unreferenced objects. In this manner, garbage collection reclaims the memory space when no longer needed, and thus helps in preventing the memory over-allocation. However, there are a lot of disadvantages associated with this approach. One of the disadvantages is that garbage collector is unaware of each thread/function holding object references. Pursuant to this, this approach fails to detect a particular function/thread responsible for memory over-allocation. Further, there is no mechanism provided by this approach to stop the execution of a thread/a function that has run into a situation of memory over-allocation. As a result, one runaway thread/function uses the entire memory space, thereby causing memory starvation for other threads/functions which in turn leads to halting of Java platform. Moreover, the current approach of garbage collection does not provide an opportunity to the application developers to define an upper limit of memory usage for each function/thread defined in the business application.

Many more solutions are available in the market for detecting memory over-allocation. One of such solutions focuses on increasing the size of memory when such scenario occurs. However, the existing solution becomes an effort intensive task as the application developers need to modify the business application to increase the size of allocated memory as per the requirement. Further, there is no mechanism provided by these solutions for detecting file exhaustion and connection over runs. Moreover, these existing solutions fail to determine possible measures that need to be taken when such scenarios/situations occur. Additionally, the existing solutions do not proactively anticipate the occurrence of such situations. Instead, these solutions focus on waiting till the time Java platform encounters these situations.

In view of the aforesaid discussion, there is a need for a method and a system to prevent a run-time platform running into such situations by proactively detecting faulty conditions in a business application. The proactive detection of the faulty conditions prevents the run-time platform suffering from such conditions. Further, there lies a need for taking appropriate measures when such conditions are detected; which in turn prevents the platform from failure/crashing. Furthermore, there also lies a need for a generic approach facilitating determination of the faulty conditions with respect to all types of resources allocated to the business application. Moreover, there exists a need to identify a function or a thread responsible for the occurrence of the faulty conditions. The method and the system should also be able to stop the execution of the function or the thread responsible for the faulty conditions and should continuously monitor resources allocated to the business application.

SUMMARY

The present invention discloses a method for preemptive detection of occurrence of one or more faulty conditions caused due to the usage of one or more resources. The faulty conditions are detected during an execution of a program, wherein the program includes at least one function. The resources are allocated to the program at the time of execution. Various examples of the resources may include, but are not limited to, memory, files, and connections. Examples of the faulty conditions described above may include, but are not limited to, memory over-allocation, file exhaustion, and connection over runs. The method described above includes initializing Application Program Interfaces (APIs) across the at least one function defined in the program. After initializing the APIs, calls to the APIs used within a namespace of the program are intercepted. The interception is performed by the at least one function through extended method classes. Thereafter, usage of the resources for the at least one function intercepting the APIs is checked against a corresponding predetermined threshold limit. The predetermined threshold limit may be set by a user based on the requirements of the program. Once the usage of the resources is checked, context of the usage of the resources is identified based on a predefined knowledge. Subsequently, occurrence of the one or more faulty conditions is determined based on the identification performed above.

The present invention further describes a system for the preemptive detection of occurrence of one or more faulty conditions based on the usage of one or more resources. Various examples of the faulty conditions may include, but are not limited to, memory over-allocation, file exhaustion, and connection over runs. The faulty conditions are detected during an execution of a program; the program includes at least one function. The program may be written in one of the programming languages, such as but are not limited to, Java, JavaScript, Visual Basic (VB), Visual FoxPro, VB.Net, Job Control Language (JCL), C, C++, C# (ASP.Net), Pearl, and Hypertext Preprocessor (PHP). The system described above includes a run-time environment configured for initializing Application Program Interfaces (APIs) across the at least one function defined in the program. The run-time environment is further configured for intercepting calls to the APIs used within a namespace of the program. The interception is performed by the at least one function through extended method classes. The system further includes a context selector configured for identifying context of the usage of the resources based on predefined knowledge. Further, the system includes an analyzer configured for checking the usage of the resources for the at least one function intercepting the APIs. The usage of the resources is checked against a corresponding predetermined threshold limit. The predetermined threshold limit may be set by a user. The analyzer is further configured for determining the occurrence of the faulty conditions based on the identification and the check performed above.

Additionally, the present invention describes a Computer Program Product (CPP) for the preemptive detection of occurrence of one or more faulty conditions based on the usage of one or more resources. Examples of the faulty conditions may include, but are not limited to, memory over-allocation, file exhaustion, and connection over runs. The faulty conditions are detected during an execution of a program; wherein the program includes at least one function. The CPP includes a program instruction means for initializing Application Program Interfaces (APIs) across the at least one function defined in the program. The CPP further includes a program instruction means for intercepting calls to the APIs used within a namespace of the program. The interception is performed by the at least one function through extended method classes. Further, the CPP includes a program instruction means for checking usage of the resources for the at least function intercepting the APIs against a predetermined threshold limit. The predetermined threshold limit may be set by a user. The CPP also includes a program instruction means for identifying context of the usage of the resources based on predefined knowledge. Moreover, the CPP includes a program instruction means for determining occurrence of the faulty conditions based on the identified context of the usage of the resources.

BRIEF DESCRIPTION OF THE DRAWINGS

Various embodiments of the invention will hereinafter be described in conjunction with the appended drawings provided to illustrate, and not to limit, the invention, wherein like designations denote like elements, and in which:

FIG. 4 depicts an exemplary report, illustrating large objects found while executing a program, in accordance with an embodiment of the present invention;

FIG. 5 represents an exemplary report depicting Large-MemoryExceptions occurred during the execution of a program, in accordance with an embodiment of the present invention.

DETAILED DESCRIPTION

Broadly, the present invention discloses a unique design pattern and a unique approach for preemptive detection of occurrence of faulty conditions during an execution of a software program. The program may be written in one or more predefined programming languages such as C, C++, C# (ASP.Net), Visual Basic (VB), VB.Net, Java, Visual FoxPro, Pascal, Common Business-Oriented Language (COBOL), and Formula Translator (FORTRAN). Also, the program may form a part of various projects such as software development projects, software re-engineering projects, documentation projects, and software maintenance projects. The faulty conditions described above occur due to faulty functions implementation in the program causing massive data allocation. Once such faulty conditions are detected, appropriate measures/actions are taken to prevent system outage. Examples of various actions may include, but are not limited to, corrective actions, preventive actions, and alerting actions.

In particular, the present invention deals in preventing resource over-allocation such as connection over runs, file handle exhaustion, and memory over-allocation. The invention provides an approach, yielding the execution control to a sub-system which can decide whether there is a likelihood of a resource over-allocation. Accordingly, appropriate measures, if applicable, may be taken so as not to allow a system crash.

For the sake of simplicity, the present invention will be described with the help of Java programming language. Thus, for a person skilled in the art, it is understood that the programming language mentioned herein is exemplary in nature and is simply used to facilitate the description of the present invention. There may be other programming languages (as described above) that can be used for implementing the present invention. Accordingly, it is clear that the invention is not limited to the embodiment described herein.

Figure 1:
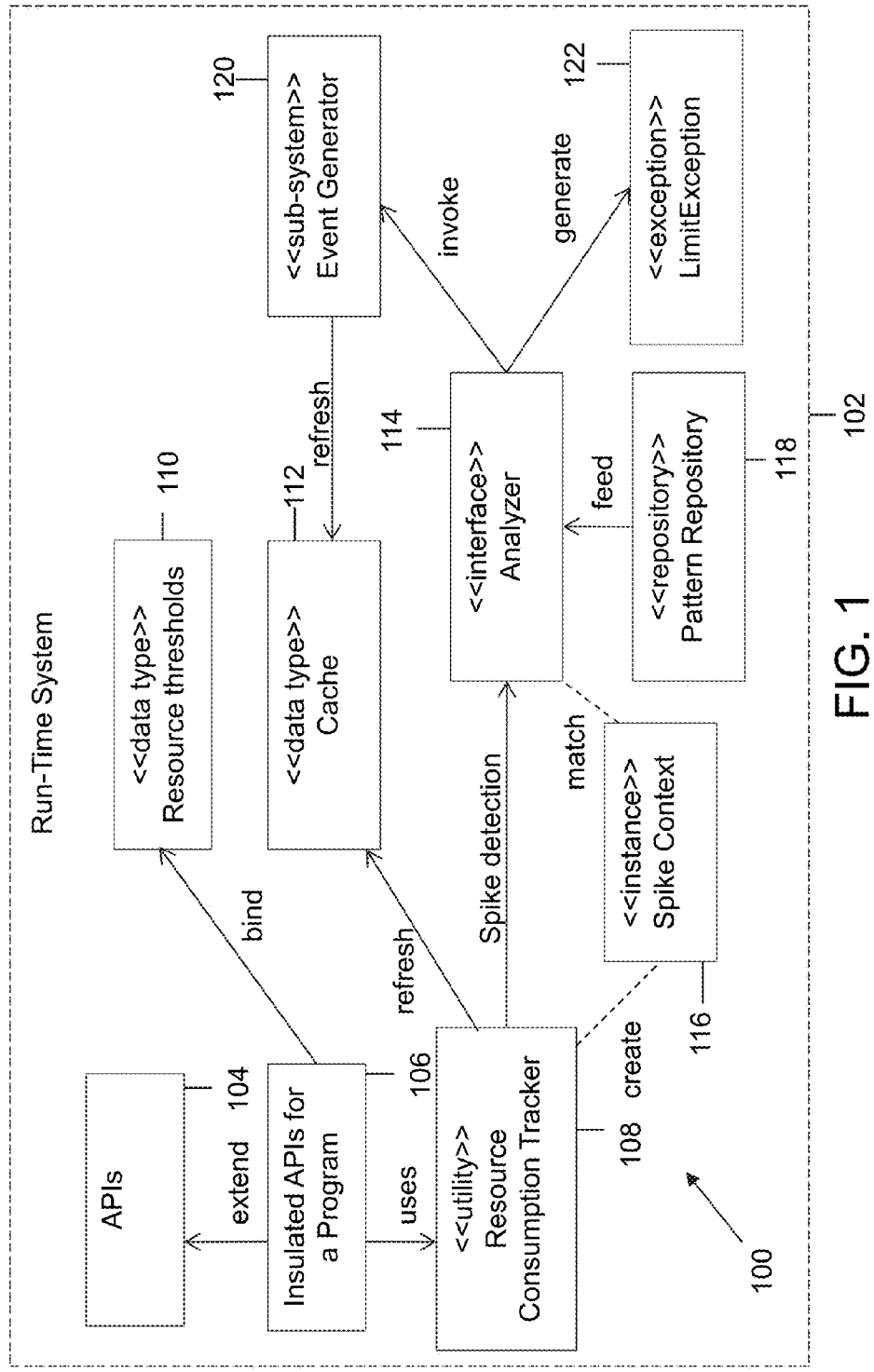
FIG. 1 illustrates an exemplary design pattern facilitating preemptive detection of the occurrence of faulty conditions based on the usage of resources, in accordance with an embodiment of the invention.

FIG. 1 illustrates an exemplary design pattern, facilitating preemptive detection of the occurrence of faulty conditions based on the usage of resources, in accordance with an embodiment of the invention. To describe the design pattern illustrated in FIG. 1, references will be made to FIG. 2, although it will be apparent to those skilled in the art that the implementation details of the design pattern can be applicable to any other embodiment of the present invention.

As shown in FIG. 1, design pattern 100 includes system elements and data structures required for preemptive detection of the faulty conditions based on the usage of resources. More specifically, design pattern 100 facilitates a unique approach for arresting "spikes" in resource allocation. Spike can be defined as the sudden fluctuations in the resource allocation. Further, the approach allows a control flow to be intercepted for performing environmental checks or event recordings, by letting the control pass into a Decision Support System (DSS, described later). The approach further allows application developers to give due consideration to environmental factors and limited resources available to the program at run-time. Event recording, as described herein, may include log details relating to the execution environment and execution context for the resources allocated to the program. The event recording may further include information such as resource quantity as requested, the threshold limits imposed for resource usage, threshold breach, and so forth. Also, the recording may include details such as whether an attempt was made to free up non-priority and non-significant resource, and if a retry attempt was made before aborting the progress of an event.

In accordance with an embodiment of the present invention, an environmental check corresponds to checking the execution context against known patterns of execution of the functions. The environmental factors may include the function name, the data structure in use, known assumptions, and constraints for the scenario of execution and knowledge about the resources available to the system in general.

In accordance with an embodiment of the present invention, design pattern 100 for arresting spikes in the resource allocation may be referred to as a spike arrestor.

In accordance with another embodiment of the present invention, design pattern 100 may be implemented as a tool used to insulate the program. The tool may run in a batch mode to recursively call each java files as per requirements and further perform the conversion of the data structure namespace.

Design pattern 100 discloses a run-time system 102 configured for executing the program. Examples of run-time system 102 may include, but are not limited to, Java Virtual Machine (JVM) or Java Run-time Environment (JRE), and Java compiler. Run-time system 102 includes Application Program Interfaces (APIs) 104, Insulated APIs 106, a resource consumption tracker 108, resource thresholds 110, a cache 112, an analyzer 114, a spike context 116, a pattern repository 118, an event generator 120, and LimitException 122. Insulated APIs 106 are also known as program specific APIs or extended APIs. Resource consumption tracker 108 is a part of the extended APIs. Further, cache 112 may also be referred to as an operational statistics cache. Moreover, analyzer 114 may also be referred to as DSS.

System elements and data structures described above will now be described in accordance with the terminology of the programming language. In accordance with this embodiment, resource consumption tracker 108 as illustrated in FIG. 1 corresponds to utility classes. Resource thresholds 110 and cache 112 correspond to data types. Analyzer 114 is referred to as an interface, and spike context 116 represents an instance. Further, event generator 120 denotes a subsystem, and LimitException 122 corresponds to an exception. In accordance with an embodiment of the present invention, system elements such as resource consumption tracker 108, resource thresholds 110, cache 112, analyzer 114, spike context 116, pattern repository 118, event generator 120, and LimitException 122 may collectively denote a sub-system, which decides whether there is a likelihood of a resource over-allocation.

Insulated APIs 106 correspond to resource holding data structures which have been extended to provide facilities for interception and allocation counting, thereby making them safe from over allocating the resources. Resource consumption tracker 108 is an embedded object in insulated APIs 104 for updating the current consumption levels of the API instance.

A context selector (not shown in the figure) forms a part of analyzer 114. Further, pattern repository 118 is fed into analyzer 114 for comparing it with the Spike context. Analyzer 114 also uses the context selector to perform the pattern matching.

As illustrated in FIG. 1, run-time system 102 executes the program. The program may be written in one of the programming languages as described above. The program includes one or more classes, wherein each of the classes includes one or more functions, one or more objects, and one or more threads. In accordance with an embodiment of the present invention, the program may be referred to as a business application.

Initially, during the execution of the program, one or more resources are allocated to the program based on the requirements of the program. Various examples of the resources allocated to the program may include, but are not limited to, memory, files, connection, and Central Processing Unit (CPU) cycles. Thereafter, APIs 104 are initialized across the functions defined in the program. Once APIs 104 are initialized, APIs 104 are extended to insulated APIs 106 through extended method classes. Thereafter, insulated APIs 106 are binded/associated to resource thresholds 110 and are further used by resource consumption tracker 108.

In accordance with an embodiment of the present invention, resource thresholds 110 may be determined for the functions defined in the program at the time APIs 104 are initialized. In accordance with another embodiment of the present invention, resource thresholds 110 may be determined at system level.

In accordance with an embodiment of the present invention, resource consumption tracker 108 enables tracking of all the resources allocated to the program. Referring to the description of FIG. 1, resource consumption tracker 108 refreshes cache 112 and interacts with analyzer 114 to detect spikes in the resources allocated to the program.

In accordance with an embodiment of the present invention, cache 112 may be initialized at the construction stage of the extended API for the program.

In accordance with an embodiment of the present invention, cache 112 may include statistical details related to the usage of the resources. The details may include, but are not limited to, objectSize, contentsize, firstAccesstime, lastAccessTime, and file handle.

In accordance with an embodiment of the present invention, statistics details included in cache 112 may be updated based on the number of objects added/removed from a particular function defined in the program.

Continuing with the description above, resource consumption tracker 108 further creates spike context for the resources allocated to the program. Thereafter, spikes context as created are matched with a predefined knowledge by analyzer 114. The predefined knowledge is fed to analyzer 114 by pattern repository 118. After performing the match, analyzer 114 determines whether any of the functions defined in the program is experiencing symptomatic instability. Thereafter, analyzer 114 invokes event generator 120 or generates LimitException 122 based on the determination and stops the execution of a particular function causing the faulty conditions. In this manner, implementation of faulty functions is completed/terminated safely. Additionally, event generator 120 refreshes cache 112.

In accordance with an embodiment of the present invention, analyzer 114 may be invoked by resource consumption tracker 108 on breach of a watch level stipulated for the functions. Accordingly, analyzer 114 takes a call based on the functions in progress and the context of usage of the resources, either to generate a LimitException 122 or to invoke event generator 120.

In accordance with an exemplary embodiment of the present invention, analyzer 114 invokes event generator 120. Subsequently, event generator 120 generates one or more events so as not to allow run-time system 102 crash. The events may include performing clean-up actions by the application developer. The clean-up actions may further include, but are not limited to, corrective actions, preventive actions, and alerting actions. For example, one of the actions may include repairing cache 112 with more representative data about the resource usage. According to this example, it can be assumed that the memory requirement for the program is 200 MB and is thus allocated to the program. Thereafter, steps, as described above, are implemented and subsequently, analyzer 114 may determine that the actual memory requirement for the program is less than the allocated 200 MB. Accordingly, reallocation of the memory to 120 MB from the earlier assumed 200 MB may be performed. In another example, one of the actions may include sending a feedback to APIs 104 to generate alarm for the application developer or for a system administrator.

In accordance with another exemplary embodiment of the present invention, analyzer 114 may generate LimitException 122. LimitException 122 is generated when resource size of any of the objects exceeds the corresponding predetermined threshold. Examples of LimitException 122 may include, but are not limited to, Large Objects, OutOfMemory, and LargeMemoryException.

In accordance with an embodiment of the present invention, event generator 120 may generate exceptions, such as LargeMemoryException and Large Objects.

In accordance with an embodiment of the present invention, pattern repository 118 may include information about behavior of functions, function usage scenarios, and the like.

In accordance with an embodiment of the invention, system elements as shown in FIG. 1 are stateless and provide global access for usage. The data structures hold and interact with each other using state information regarding resource usage and are, therefore, in a "state". All behavioral system elements, for performing checks on the data structures or deciding on the course of action, can be accessed globally and in a reentrant manner.

Figure 2:
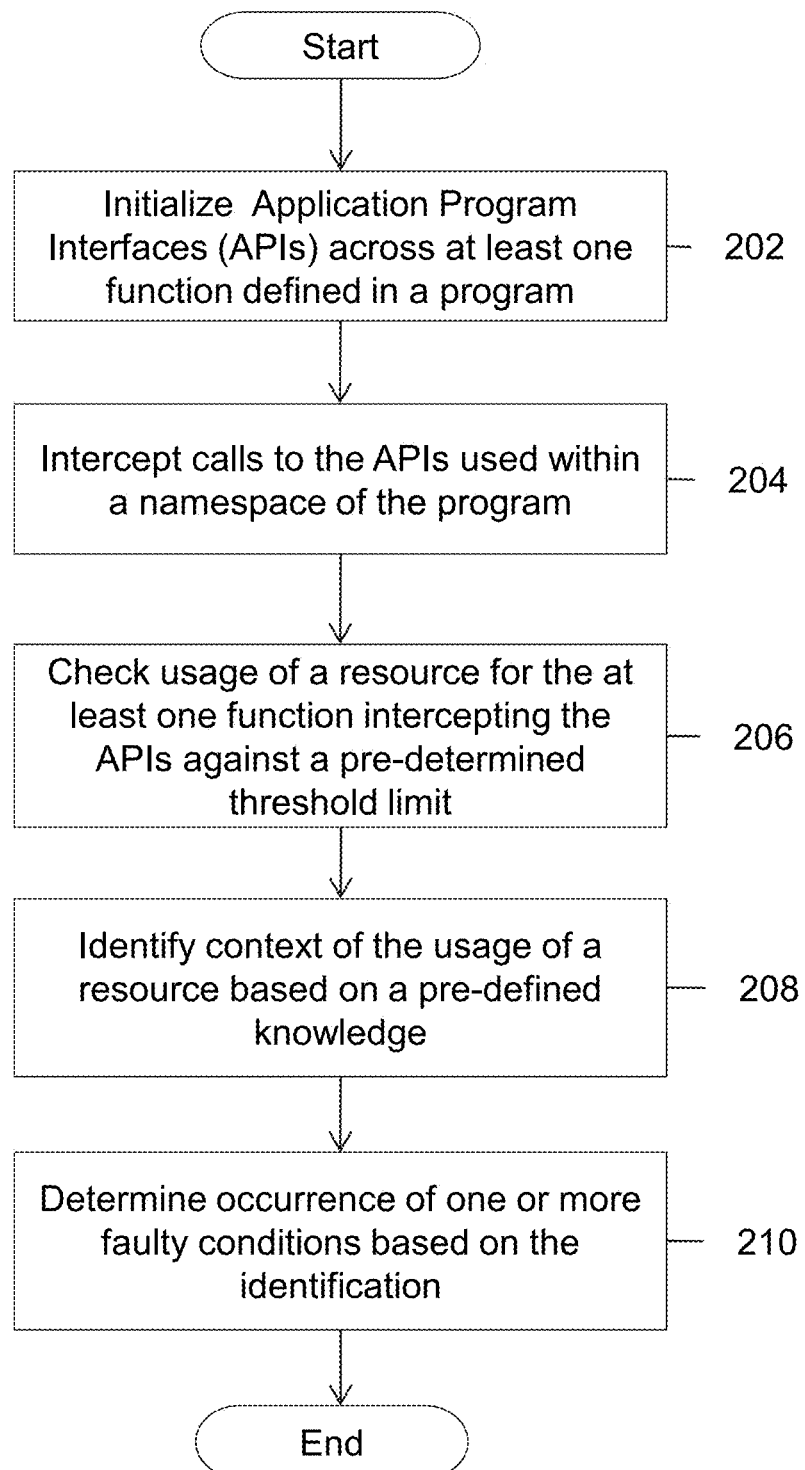
FIG. 2 depicts a flow diagram for preemptive detection of the occurrence of faulty conditions based on the usage of resources, in accordance with an embodiment of the invention.

FIG. 2 depicts a flow diagram for preemptive detection of the occurrence of faulty conditions based on the usage of resources, in accordance with an embodiment of the invention. To describe the flow diagram illustrated in FIG. 2, references will be made to FIG. 1, FIG. 4, and FIG. 5, although it will be apparent to those skilled in the art that the steps/method of the flow diagram can be applicable to any other embodiment of the present invention.

The main objective of FIG. 2 is to proactively detect faulty conditions in a program. Various examples of the faulty conditions may include, but are not limited to, connection over runs, file handle exhaustion, and memory over-allocation. The faulty conditions occur due to faulty functions implementation that attempts to load data, and use resources in excess of its general usage scenarios. The approach includes determining thresholds (upper limits) for the resources allocated to the program. Once the thresholds are determined, they are applied to the resources for preventing any uncontrolled usage of the resources by each function of the program, thereby crashing or failure of a system or an application is prevented.

In particular, FIG. 2 determines resource over-allocation situations within each function or each thread of the program by arresting spikes in the resource allocation. The detailed process of preemptive detection of the occurrence of faulty conditions has been explained below.

In accordance with an embodiment of the invention, the occurrence of faulty conditions is determined by applying one or more heuristic algorithms. For a person skilled in the art, it is understood that various types of heuristic algorithms exist in the art and thus can be referred to.

The flowchart of FIG. 2 depicts a detailed process for catching faulty conditions in the program at the time of execution of the program. The program includes one or more classes, wherein the classes include one or more functions, one or more objects, and one or more threads. Further, the program may be in written in any of the programming languages as described above. In accordance with a preferred embodiment of the invention, the program may be written in Java. The program is further executed by a run-time system, such as run-time system 102. The run-time system will hereinafter be referred to as a system. In accordance with an embodiment of the present invention, the program may be executed by a Java Run-time Environment (JRE) or a Java Virtual Machine (JVM).

Initially, during the execution of the program, one or more resources are allocated to the program. The resources are then allocated to the program based on the requirements of the program. Various examples of the resources may include, but are not limited to, memory, files, CPU (Central Processing Unit) cycles, and connections. Further, various types of connections may include, but are not limited to, Java DataBase (JDB) connection and Java Message Service (JMS) connections. After allocating the resources, a threshold limit for each of the resources is determined and applied to the resources. In accordance with an embodiment of the present invention, the threshold limits are defined based on the requirements of the program to operate in a smooth manner without requiring the throttling of normal functionality of the program. More resources get allocated across the functions defined in the program, provided the threshold is not breached.

In accordance with an exemplary embodiment of the present invention, CPU cycle resource has been described herein. CPU cycle overload may get triggered due to an infinite loop causing a CPU starvation for other threads which in turn leads to a system standstill. To overcome this scenario, the threads time-slice on a CPU in a specific burst can be tracked and controlled thereby.

In accordance with another exemplary embodiment of the present invention, file handle has been described. A check for all the "files opened" and their corresponding "files used" in a function can detect the file handle leaks. Looking at the time period for which a file handle has not been used, a correct and descriptive message indicating the leak can be entered in a log or a database.

In accordance with yet another exemplary embodiment of the present invention, memory resource usage has been described herein. Memory resource overuse in a function can arise due to an incorrect interpretation of function data or due to missing attributes. For scenarios where search criterion is missed, it may lead to a full table load into memory, thereby overloading the memory.

At 202, Application Program Interfaces (APIs) are initialized across the functions defined in the program. Once the APIs are initialized, at 204, calls to the APIs used within a namespace of the program are intercepted. The interception is performed by the functions through extended method classes. In this manner, the APIs are extended to program specific APIs. The APIs are extended to the program specific APIs having the same class name, but a different package name. For example, "java.util.Vector" may be extended to "com.infosys.insualte.util.Vector". In other example, "java.util.Hashmap.put" may be extended/delegated to "com.infosys.insulate.util.hashmap.put". At the same time, namespace of the functions are automatically changed to program specific API namespace.

In accordance with an embodiment of the present invention, the extended implementation allows the function control to be passed into a sub-system which maintains and evaluates the resource usage related statistics for the function which invoked the API. Thus, the extended APIs are capable of tracking of the count of monitored resources.

In accordance with an embodiment of the present invention, all resources allocated to the program are mapped to the program specific APIs.

Continuing with the description above, each time when the calls to the APIs are intercepted, the intercepted APIs are monitored for a predefined threshold level. Further, intercepting calls to the APIs includes monitoring the intercepted classes for the total resources allocated to all instances of the program. However, it should be noted that keeping track of resources for an overrun is an expensive routine computationally. Each call to compute the resource usage can in turn cause an adverse impact on the system bandwidth. Since scenarios of over allocation due to a faulty condition are rare and are usually related with a sudden surge in demand for the resource, a "watch level" can be set at the API level such that resource allocation gets monitored only if the count of instances of the resources used in the function surpasses a certain high limit. This high limit is called "watch level" and can be considered as a watermark for the resource usage within the considered function.

In accordance with an embodiment of the present invention, the predefined threshold level may be set by a programmer based on the requirements of the program. In accordance with another embodiment of the present invention, the predefined threshold level may be set automatically based on the requirements of the program.

Thereafter, at 206, usage of the resources corresponding to the functions intercepting the APIs is checked. The usage of the resources is checked against a predetermined threshold limit. In accordance with an embodiment of the present invention, the predetermined threshold limit may be set by the application developer based on the requirements of the program. In accordance with another embodiment of the present invention, the predetermined threshold limit may be set automatically based on the requirements of the program.

Further, statistics related to the usage of the resources are maintained. In accordance with a preferred embodiment of the invention, statistics related to the usage of the resources are updated based on the number of objects/elements added or removed from each function of the program. The statistics are updated in real-time.

In accordance with an embodiment of the invention, the usage of the resources may be checked by GetObjectsize function. This feature has been implemented to calculate the size of a collection class in the Java APIs. Every object added or removed in the program is tracked. Whenever the number of objects in the collection of classes exceeds a threshold limit, the memory size of collection is calculated and statistics class is updated. After that, each incoming request for addition or deletion of objects into the collection instance is further checked for at designated intervals to recalculate the maximum size held in the collection.

After checking the usage of the resources, at 208, "context of usage" of the resources is identified. The context of the usage of the resources is identified based on a predefined knowledge. The predefined knowledge may be stored in a knowledge base, such as pattern repository 114. In accordance with an embodiment of the present invention, the predefined knowledge may represent function usage scenarios, generic behavior of functions, and the like. Subsequently, at 210, occurrence of the faulty conditions based on the identified context is determined.

In accordance with an embodiment of the present invention, the system maintains a cache of resources or and may perform a bulk operation. The system may further maintain information relating to function behavior. The knowledge of the function behavior, for example, may allow the clean up of the old resources in favor of the current demand without impacting on the general functionality.

In an exemplary embodiment of the present invention, a case can be considered where the usage of the resource exceeds the predetermined threshold limit. Subsequently, the context of the usage of this particular resource is checked. For example, if the context of the usage of the resources is genuine, no faulty condition is determined. Else, the occurrence of the faulty condition is determined.

As the occurrence of the faulty conditions may lead to non-recoverable situation for the system, accordingly, one or more actions (measures) to be taken are generated. By taking the appropriate actions, crashing or halting of the system can be prevented, and thus the quality of service levels from the system is enhanced. Various examples of such actions may be corrective actions, preventive actions, and alerting actions as described above. In accordance with an exemplary embodiment of the present invention, the actions may include performing housekeeping, alerting a central dashboard system, or emanating an exception to unwind the function execution. Before generating the run-time exceptions, the opportunity has been given to the application developer to take corrective or preventive actions.

In accordance with another exemplary embodiment of the present invention, there may be scenarios where no corrective actions or preventive actions are possible. In such cases, the system applies a braking logic on a function or a thread responsible for the faulty conditions. The braking logic is applied to unload current instances of the execution, thereby preventing the system abortion.

In accordance with an embodiment of the present invention, a report containing details associated with the faulty conditions is generated. The report may highlight one of the functions or the objects responsible for the faulty conditions. Thus, the functions responsible for the faulty conditions can be determined. In accordance with this embodiment, a report as shown in FIG. 4 illustrates large objects found at the time of execution of the program. These objects are responsible for the occurrence of the faulty conditions.

In another exemplary embodiment of the present invention, FIG. 5 shows a report depicting one or more LargeMemoryExceptions. The LargeMemoryExceptions are encountered at the time of executing the program.

In accordance with an embodiment of the present invention, the methodology disclosed in FIG. 2 indicates the capability of self learning. For instance, the self learning capability is enhanced by adding function usage scenarios and more incident records related to various types of measures taken into the pattern repository.

In accordance with an embodiment of the present invention, self learning feature has been described in detail. Self learning is derived from (i) the track record of a function behavior and (ii) a chart of resource usage patterns in a functional system. This helps in providing usage related statistics into a catalogue maintained within the system. Further, attributes such as function name, the API used, the high level of resource allocated, and the frequency at which watch levels are breached are maintained within the system. The maintenance of these details enhances the self learning capability of the present invention. For example, last time resource used by a program helps in dynamically updating watch levels, thresholds, and corrective action name at function level. With the passage of time, adequate statistics is collected and fed back into the system such that the functions will have optimum values of watch levels and thresholds and improved dampeners. In this manner, unnecessary spikes can be eliminated and this further leads to a highly smooth system operation.

In accordance with an embodiment of the present invention, the methodology disclosed in the present invention may be implemented for various business applications. Examples of various business applications may include, but are not limited to Customer Relationship Management (CRM), Human Resource Management (HRM), Enterprise Asset Management (EAM), Workforce Management, Performance Management, and Enterprise Resource Planning (ERP).

In accordance with another embodiment of the present invention, the methodology disclosed above may be implemented for banking solutions/banking products, such as Finacle™ from Infosys Technologies®.

In accordance with an exemplary embodiment of the present invention, data structures or core components involved in catching the faulty conditions are described herein. The core components may include, but are not limited to, util, FinacleInsulationConstants, FinacleLargeMemoryException, FinacleStatistics, GetObjectsize, InuslateHook, InsulateUtil, and MANIFEST.MF.

In accordance with an exemplary embodiment of the present invention, one or more safe resources associated with the program have been listed. The safe resources may include, but are not limited to, ArrayList, HashMap, HashSet, IdentifyHashMap, LinkedHashMap, LinkedHashSet, LinkedList, Priority Queue, Stack, TreeMap, TreeSet, Vector, and WeakHashMap.

For one ordinary skilled in the art, it is understood that the invention is not limited only to the embodiments described above.

To further elaborate the various features of the present invention, program codes supporting the above description have been disclosed in subsequent paragraphs.

In accordance with an embodiment of the present invention, an exemplary program code for defining the threshold limits for resources has been described herein. In particular, threshold limits have been defined for memory allocations. The threshold limits are provided as constant classes which are used at the build time. The program code may include the following:

```
Package.com.infosys.insulate;
Public class FinacleInsulationConstants {
    Public static Final long KILOBYTE = 1024L;
    Public static Final long MEGABYTE = 1024L * 1024L;
    Public static Final long GIGABYTE = 1024L * 1024L *1024L;
    Public static final string FILETHREAD =
    "D: /test/ insulate1 / scr /com / text5.txt";
    Public static final int MAXTHREADS = 1;
    Public static final int HEAD = 0;
    Public static final int INITIALVALUE = 0;
    Public static long INCREASEDMAXSIZE = 400 *1024 * 1024;
    Public static final int WATCHLEVEL = 1000;
    Public static final long MAXSIZE = 200*1024*1024;
    Public static Boolean DEBUG = false;
    Public static final int MAXTRIES = 4;
}
```

In accordance with another embodiment of the present invention, an exemplary code for defining statistics check class for object size comparison is described herein. The program code may include the following:

```
Import java.sql.timestamp;
Import java.util.Collection;
Import java.util.HashMap;
Import java.util.Iterator;
Import java.util.TreeMap;
Import com.infosys.insulate.util.IdentifyHashmap;
Import com.infosys.insulate.util.WeakHashmap;
/**
*This class compares the size of the object, with the maximum permitted
    size and accordingly sets the statistics of the object. If the size
    exceeds the maximum limit, the exception is thrown.
*/
Public class InsulateUtil {
/**
* Class for holding the statistics
*/
Public FinacleStatistics finaclestatisticsobj = null;
/**
* For handling statistics results
*/
Long bvalue;
/**
* Checks the object size with maximum permitted size and sets the
* statistics @param obj whose size has to be checked.
*/
}
```

In accordance with this embodiment of the present invention, an exemplary code for statistics check has been disclosed. The program code may include:

```
Public long Checkstatistics (HashMap obj, long lobjectsize, Timestamp
    tTimeStamp, longlMaxsize) {
If (lobjectsize >= lMaxsize) {
System.out.println ("size before adjust:" +lobjectsize);
```

```
Initiatevalues ( );
finaclestatisticsobj.setFirstAccessTime (tTimeStamp);
finaclestatisticsobj.setobjectType (obj. getClass ( ).getCanonicaName ( ));
finaclestatisticsobj.setobjectsize (lobjectsize);
Lobjectsize = Getobjectsize.deepsizeof (obj.entrySet ( ). toArray ( ));
system.out.println ('Adjusting Size:" +lobjectSize);
If (lobjectsize >=lMaxsize) {
Long rv = InsulateHook.appHandler (obj, "HashMap", lobjectsize,
lMaxsize);
If (rv == -1)
System.out.println (finaclestatisticsobj.tostring ( ));
Throwingfunction ( );
}
Else {
bvalue =rv;
}
}
else
{
bvalue = lobjectsize;
}
}
else
{
bvalue = lobjectsize;
}
return bvalue;
}
}
```

In accordance with yet another embodiment of the present invention, an exemplary code illustrating the implementation of statistics cache holding the object size and monitoring of resources has been described. The program code may include the following:

```
Import java.sql.Timestamp;
Import com.infosys.insulate.Getobjectsize;
Public class FinacleStatistics {
Public long lobjectsize;
Public int stringContentsize;
Public TimeStamp firstAccesstime;
Public string objectType;
Public TimeStamp lastAccessTime;
}
```

In accordance with further embodiment of the present invention, an exemplary code illustrating the implementation details when a threshold level is breached. The program may include the following:

```
Import java.util.HashMap;
Import java.util.Map;
Import java.util.Vector;
Import java.util.Iterator;
Public class InsulateHook {
Private static HashMap hHashMap = new HashMap ( );
Public static long aaphandler (object obj, string identifier, long objectSize,
long maxsize)
    {
System.out.println ("obj ---->" +obj.tostring ( ));
If (identifier.equalsIgnoreCase ("HashMap")) {
HashMap hashmap = (HashMap) obj;
Return cleanupCountKeeper (hashmap);
}
Else if (identifier.eugalsIgonreCase ("Vector")) {
Vector vector = (vector) obj;
Return cleanupCountKeeper (Vector);
}
Return -1;
}
Private static synchronized long cleanCountKeeper (object obj) {
Long lobjectsize = 0;
```

```
Integer iCount = (Integer) hHashMap.get (System.identifyHashCode
(obj));
If (iCount ==null) {
iCount =0;
}
If (iCount >=FinacleInsulationConstants.MAXTRIES) {
Return -1;
}
Else {
iCount++;
hHashmap.put (System.identifyHashCode (obj), iCount);
lobjectSize = GetObjectSize.deepSizeof (obj);
}
return lobjectsize;
}
}
```

In accordance with this exemplary embodiment of the present invention, an exemplary code for adding memory to data structures has been described. The program code may include the following:

```
Public ArrayList (Collection<E> C) {
Super(C);
setFirstAccessTimeForClass ( );
insUtilObj = new InsulateUtil ( );
If (GetobjectSize.deepsizeof (c.toarray ( ))> lMaxSize {
insUtilObj.throwingFunction ( );
}
}
Public Boolean add (E o) {
If (this.size ( )> (FinacleInsulationConstants.WATCHLEVEL)) {
If (lobjectsize==0) {
Lobjectsize = Getobjectsize.deepsizeof (o, iflag);
}
Lobjectsize = insUtilObj.checkstatistics (this, lobjectsize,
tFirstAccessTime, lMaxSize);
}
Boolean bBoolean = super.add (o);
Printsize ( );
Return bBoolean;
}
```

In accordance with one more embodiment of the present invention, an exemplary code to extend the default data structure into a class having additional controls for checking the usage of resource has been depicted below. The program code may include the following:

```
Public class ArrayList<E> extends java.util.ArrayList<E> {
Private static final long serialversionUID = XXXXXXXXXXXXXXXXX;
Public transient InsulateUtil insUtilObj = null;
Public timestamp tFirstAccessTime;
Private long lobjectsize = FinalceInsualtionConstants.MAXSIZE;
Private int iFlag =1;
Public Arraylist ( )
{
Super ( );
setFirstAccessTimeForClass ( );
insUtilObj = new InsulateUtil ( );
}
}
```

In accordance with an additional embodiment of the present invention, an exemplary code for changing namespace of data structure of a program has been disclosed. The program code may include the following:

```
Package com.infosys.inuslate.util;
Import java.sql.Timestamp;
```

```
Import java.util.Collection
Import com.infosys.inuslate.FinacleInsulationConstants;
Import com.infosys.insulate.Getobjectsize;
Import com.infosys.insulate. Insulateutil;
Public class ArrayList <E> extends java.util.ArrayList <E>
{
Private static final long serialSerevrUID = XXXXXXXXXXXXL;
}
```

In accordance with an embodiment, an exemplary code illustrating exceptions have been described. The exceptions are used for aborting the functions causing resource over-allocation. The program code may include the following:

```
Package.com.infosys.insulate;
Public class FinacleLargeMemoryException extends RuntimeException {
FinacleLargeMemoryException (object c) { }
}
```

For a person skilled in the art, it is understood that the program codes as described above are exemplary in nature and are simply used to facilitate the description of the present invention. The program codes depicted above may be written in one or more programming languages. The program code may or may not represent the completeness of a component, but are sufficiently described in a sequence corresponding to the features described above. Thus, it is clear that the invention is not limited to the embodiments described herein.

Figure 3:
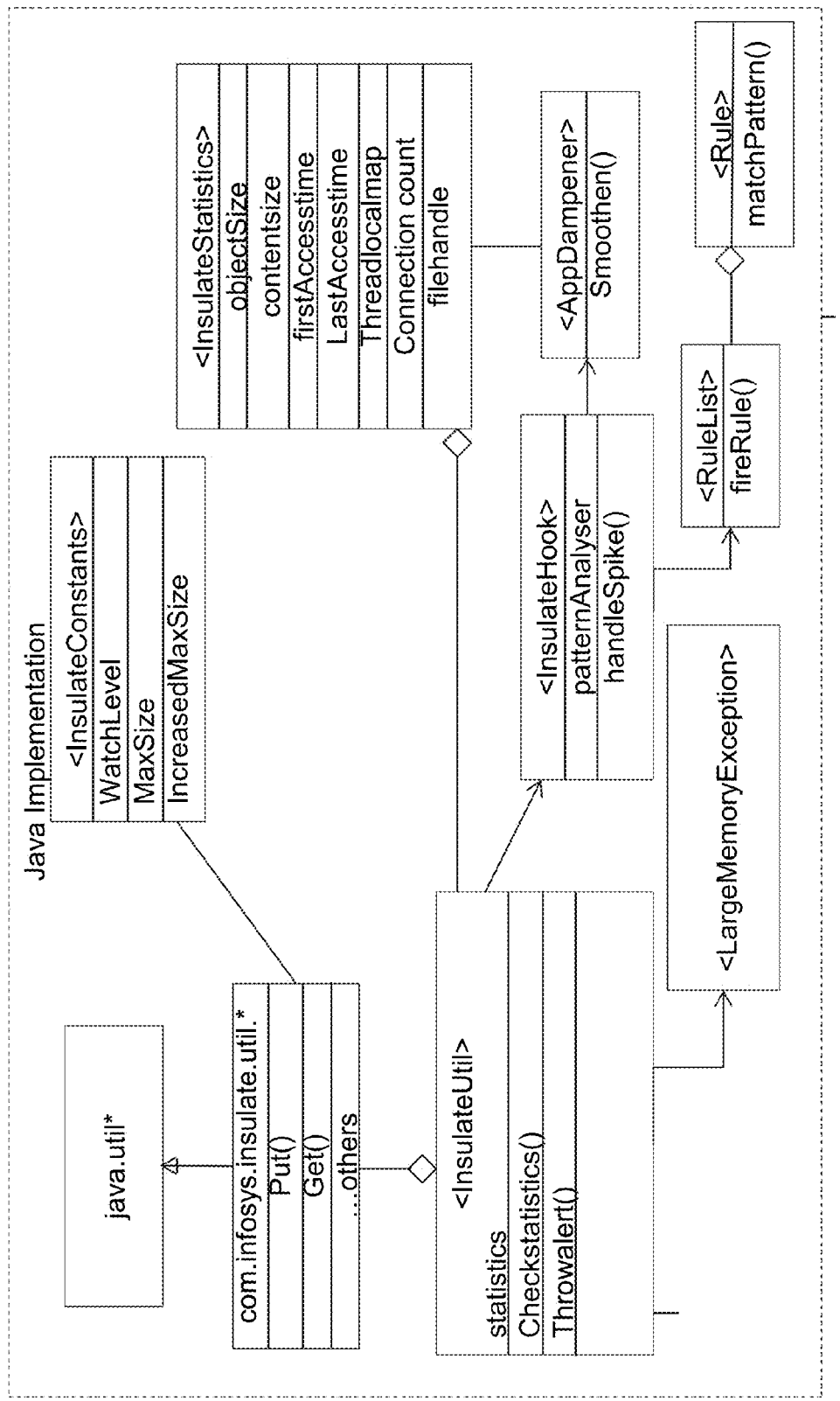
FIG. 3 shows an exemplary design pattern for preemptive detection of memory over-allocation scenarios, in accordance with an embodiment of the present invention.

FIG. 3 shows an exemplary design pattern for preemptive detection of memory over-allocation scenarios, in accordance with an embodiment of the present invention. To describe the design pattern illustrated in FIG. 3, references will be made to FIGS. 1 and 2, although, it will be apparent to those skilled in the art that the implementation details of the design pattern can be applicable to any other embodiment of the present invention.

Design pattern 300 as depicted in FIG. 3 arrests spikes in the memory allocation. Design pattern 300 includes system elements and data structures required for detecting the memory over-allocation. Initially, during the execution of the program, one or more resources are allocated to the program based on the requirements of the program.

According to FIG. 3, API such as "java.util*" is extended/converted to program specific API such as, "com.infosys.inuslate.util". The extended API as shown in FIG. 3 includes one or more functions such as put ( ) and get ( ). The extended API is further associated with data types such as WatchLevel, Maxsize, and IncreasedMaxSize and interacts with a resource consumption tracker, such as resource consumption tracker 108. The resource consumption tracker tracks all the resources being used by the program. As an instance, the resource consumption tracker maintain various functions such as statistics ( ), check statistics ( ), and throw alert ( ) for tracking the usage of the resources. Furthermore, the resource consumption tracker refreshes data stored in a cache, such as cache 112. The cache includes details such as objectSize, contentsize, firstAccestime, lastAccessTime, Threadlocalmap, connection count, and file handle. The cache further interacts with an analyzer, such as analyzer 114 to detect spikes in the memory allocation.

Figure 6:
FIG. 6 depicts an exemplary screenshot, illustrating graceful termination of function experiencing an OutOf-Memory spike, in accordance with an embodiment of the present invention.

Thereafter, analyzer performs pattern matching by contacting a repository containing various details. The details may include behavior of various functions, function usage scenarios and the like. Based on the pattern matching, the analyzer determines the occurrence of memory over-allocation. Once such a condition is detected, either appropriate measures are generated or exceptions are generated. In this manner, termination or completion of the faulty functions is performed gracefully by generating exception, such as OutOfMemory exception as shown in FIG. 6.

The present invention described above has numerous advantages. The present invention facilitates a proactive (or preemptive) approach for detecting faulty conditions in a program, in particular, resource over-allocation. The proactive approach of detecting the faulty conditions helps in minimizing the system failure. The present invention further describes various measures to be taken once such faulty conditions are detected, thereby preventing failure or crashing of system or application. Further, the present invention facilitates an identification of function or thread responsible for the faulty conditions. Furthermore, the present invention discloses a unique design pattern which is generic in nature and can be utilized for identifying faulty conditions with respect to all types of resources. Moreover, the approach disclosed by the present invention indicates the capability of self learning in nature. The present invention further enhances the capability of APIs to evaluate the usage of resources by extension method classes. In addition to this, the present invention allows application developers to give due considerations to environmental factors.

The method and the system for preemptive detection of occurrence of faulty conditions based on resource usage, or any of its components, as described in the present invention, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method for the present invention.

The computer system typically comprises a computer, an input device, and a display unit. The computer typically comprises a microprocessor, which is connected to a communication bus. The computer also includes a memory, which may include a Random Access Memory (RAM) and a Read Only Memory (ROM). Further, the computer system comprises a storage device, which can either be a hard disk drive or a removable storage drive such as a floppy disk drive and an optical disk drive. The storage device can be other similar means for loading computer programs or other instructions into the computer system.

The computer system executes a set of instructions (or program instruction means) that are stored in one or more storage elements to process input data. These storage elements can also hold data or other information, as desired, and may be in the form of an information source or a physical memory element present in the processing machine. Exemplary storage elements include a hard disk, a DRAM, an SRAM, and an EPROM. The storage element may be external to the computer system and connected to or inserted into the computer, to be downloaded at, or prior to the time of use. Examples of such external computer program products are computer-readable storage mediums such as CD-ROMS, Flash chips, and floppy disks.

The set of instructions may include various commands that instruct the processing machine to perform specific tasks such as the steps that constitute the method for the present invention. The set of instructions may be in the form of a software program. The software may be in various forms such as system software or application software. Further, the software may be in the form of a collection of separate programs, a program module with a large program, or a portion of a program module. The software may also include modular programming in the form of object-oriented programming. The software program that contains the set of instructions (a program instruction means) can be embedded in a computer program product for use with a computer, the computer program product comprising a computer usable medium with a computer readable program code embodied therein. Processing of input data by the processing machine may be in response to users' commands, results of previous processing, or a request made by another processing machine.

The modules described herein may include processors and program instructions that are used to implement the functions of the modules described herein. Some or all the functions can be implemented by a state machine that has no stored program instructions or in one or more Application-specific Integrated Circuits (ASICs), in which each function or some combinations of some of the functions are implemented as custom logic.

While the various embodiments of the invention have been illustrated and described, it will be clear that the invention is not limited only to these embodiments. Numerous modifications, changes, variations, substitutions, and equivalents will be apparent to those skilled in the art, without departing from the spirit and scope of the invention.

What is claimed is:

1. A method for preemptive detection of occurrence of one or more faulty conditions based on usage of one or more resources executed by one or more computing devices, the one or more faulty conditions are detected during an execution of a program, the program comprising at least one function, the method comprising:
   a. initializing Application Program Interfaces (APIs) across the at least one function defined in the program;
   b. intercepting calls to the APIs used within a namespace of the program, the interception being performed by the at least one function through extended method classes;
   c. checking the usage of the one or more resources for the at least one function intercepting the APIs, the usage of the one or more resources being checked against a corresponding pre-determined threshold limit;
   d. identifying context of the usage of the one or more resources based on a pre-defined knowledge; and
   e. determining the occurrence of the one or more faulty conditions based on the identification.

2. The method of claim 1, further comprising extending the APIs to program specific APIs.

3. The method of claim 1, further comprising monitoring the intercepted APIs for a pre-defined threshold level.

4. The method of claim 1, further comprising initializing the one or more resources allocated to the program, the one or more resources are allocated based on requirements of the program.

5. The method of claim 1, further comprising maintaining statistics related to the usage of the one or more resources.

6. The method of claim 1, further comprising generating one or more actions after detecting the occurrence of the one or more faulty conditions.

7. The method of claim 6, wherein the one or more actions comprise corrective actions, preventive actions, and alerting actions.

8. The method of claim 1, further comprising generating a report containing details associated with the one or more faulty conditions.

9. The method of claim 8, further comprising highlighting at least one of: the at least one function and objects in the report.

10. The method of claim 1 further comprising applying a braking logic on a function or thread responsible for the faulty condition thereby preventing failure of the program.

11. A system for preemptive detection of occurrence of one or more faulty conditions based on usage of one or more resources, the one or more faulty conditions are detected during an execution of a program, the program comprising at least one function, the system comprising:
   At least one processor in operable communication with a computer readable storage medium, the computer readable storage medium containing one or more programming instructions whereby the at least one processor is configured to implement:
   a. a run-time environment configured for:
      i. initializing Application Program Interfaces (APIs) across the at least one function defined in the program; and
      ii. intercepting calls to the APIs used within a namespace of the program, the interception being performed by the at least one function through extended method classes;
   b. a context selector configured for identifying context of the usage of the one or more resources based on a pre-defined knowledge; and
   c. an analyzer configured for:
      i. checking the usage of the one or more resources for the at least one function intercepting the APIs, the usage of the one or more resources being checked against a corresponding pre-determined threshold limit; and
      ii. determining the occurrence of the one or more faulty conditions based on the identification and the check performed.

12. The system of claim 11, further configured for extending the APIs to program specific APIs.

13. The system of claim 11, further configured for monitoring the intercepted APIs for a pre-defined threshold level.

14. The system of claim 11, further configured for initializing the one or more resources allocated to the program, the one or more resources are allocated based on requirements of the program.

15. The system of claim 11, further comprising a cache configured for maintaining statistics related to the usage of the one or more resources.

16. The system of claim 11, further comprising an event generator module configured for generating one or more actions after detecting the occurrence of the one or more faulty conditions.

17. The system of claim 16, wherein the one or more actions comprise corrective actions, preventive actions, and alerting actions.

18. The system of claim 11, further configured for generating a report containing details associated with the one or more faulty conditions.

19. The system of claim 18, further configured for highlighting at least one of: the at least one function and objects in the report.

20. The system of claim 11, wherein the program being written in a pre-defined programming language.

21. A computer program product for use with a computer, the computer program product comprising a nontransitory computer usable storage medium having a computer readable program code embodied therein for preemptive detection of occurrence of one or more faulty conditions based on usage of one or more resources, the one or more faulty conditions are detected during an execution of a program, the program comprising at least one function, the computer readable program code storing a set of instructions comprising instructions for causing at least one computer processor to:
a. initialize Application Program Interfaces (APIs) across the at least one function defined in the program;
b. intercept calls to the APIs used within a namespace of the program, the interception being performed by the at least one function through extended method classes;
c. check the usage of the one or more resources for the at least one function intercepting the APIs, the usage of the one or more resources being checked against a corresponding pre-determined threshold limit;
d. identify context of the usage of the one or more resources based on a pre-defined knowledge; and
e. determine the occurrence of the one or more faulty conditions based on the identification.

22. The computer program product of claim 21, further comprising instructions for causing the at least one computer processor to extend the APIs to program specific APIs.

23. The computer program product of claim 21, further comprising instructions for causing the at least one computer processor to automatically change the namespace of the at least one function to program specific API namespace.

24. The computer program product of claim 21, further comprising instructions for causing the at least one computer processor to monitor the intercepted APIs for a pre-defined threshold level.

25. The computer program product of claim 21, further comprising instructions for causing the at least one computer processor to initialize the one or more resources allocated to the program, the one or more resources are allocated based on requirements of the program.

26. The computer program product of claim 21, further comprising instructions for causing the at least one computer processor to maintaining statistics related to the usage of the one or more resources.

27. The computer program product of claim 21, further comprising instructions for causing the at least one computer processor to generate one or more actions after detecting the occurrence of the one or more faulty conditions.

28. The computer program product of claim 27, wherein the one or more actions comprise corrective actions, preventive actions, and alerting actions.

29. The computer program product of claim 21, further comprising instructions for causing the at least one computer processor to generate a report containing details associated with the one or more faulty conditions.

30. The computer program product of claim 29, further comprising highlighting at least one of: the at least one function and objects in the report.

* * * * *